(12) United States Patent
Katou et al.

(10) Patent No.: US 7,399,257 B2
(45) Date of Patent: Jul. 15, 2008

(54) SYSTEM AND METHOD OF CONTROLLING AUTOMATIC TRANSMISSION

(75) Inventors: Yoshiaki Katou, Kanagawa (JP); Yasushi Yabe, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 173 days.

(21) Appl. No.: 11/201,329

(22) Filed: Aug. 11, 2005

(65) Prior Publication Data
US 2006/0040789 A1    Feb. 23, 2006

(30) Foreign Application Priority Data
Aug. 17, 2004    (JP) .............................. 2004-237582

(51) Int. Cl.
*F16H 59/00* (2006.01)
(52) U.S. Cl. ........................ 477/98; 477/167
(58) Field of Classification Search ............. 477/97, 477/98, 167, 174
See application file for complete search history.

(56) References Cited

U.S. PATENT DOCUMENTS

| 5,042,323 A | * | 8/1991 | Murano et al. ................. 477/45 |
| 6,344,016 B1 | * | 2/2002 | Eguchi ........................ 477/175 |
| 7,025,706 B2 | * | 4/2006 | Katou ........................... 477/45 |
| 7,089,095 B2 | * | 8/2006 | Takami et al. .................. 701/22 |

FOREIGN PATENT DOCUMENTS

JP    2002-266901 A    9/2002

* cited by examiner

*Primary Examiner*—Tisha D Lewis
(74) *Attorney, Agent, or Firm*—Foley & Lardner LLP

(57) ABSTRACT

A system for controlling an automatic transmission includes a start clutch, an engagement element arranged in series to the start clutch and engaged during vehicle driving, and an ECU for controlling the start clutch and the engagement element, wherein the ECU is programmed to select, at vehicle start, one of the start clutch and the engagement element in accordance with one of the oil temperature within the transmission and the throttle-valve opening.

14 Claims, 10 Drawing Sheets

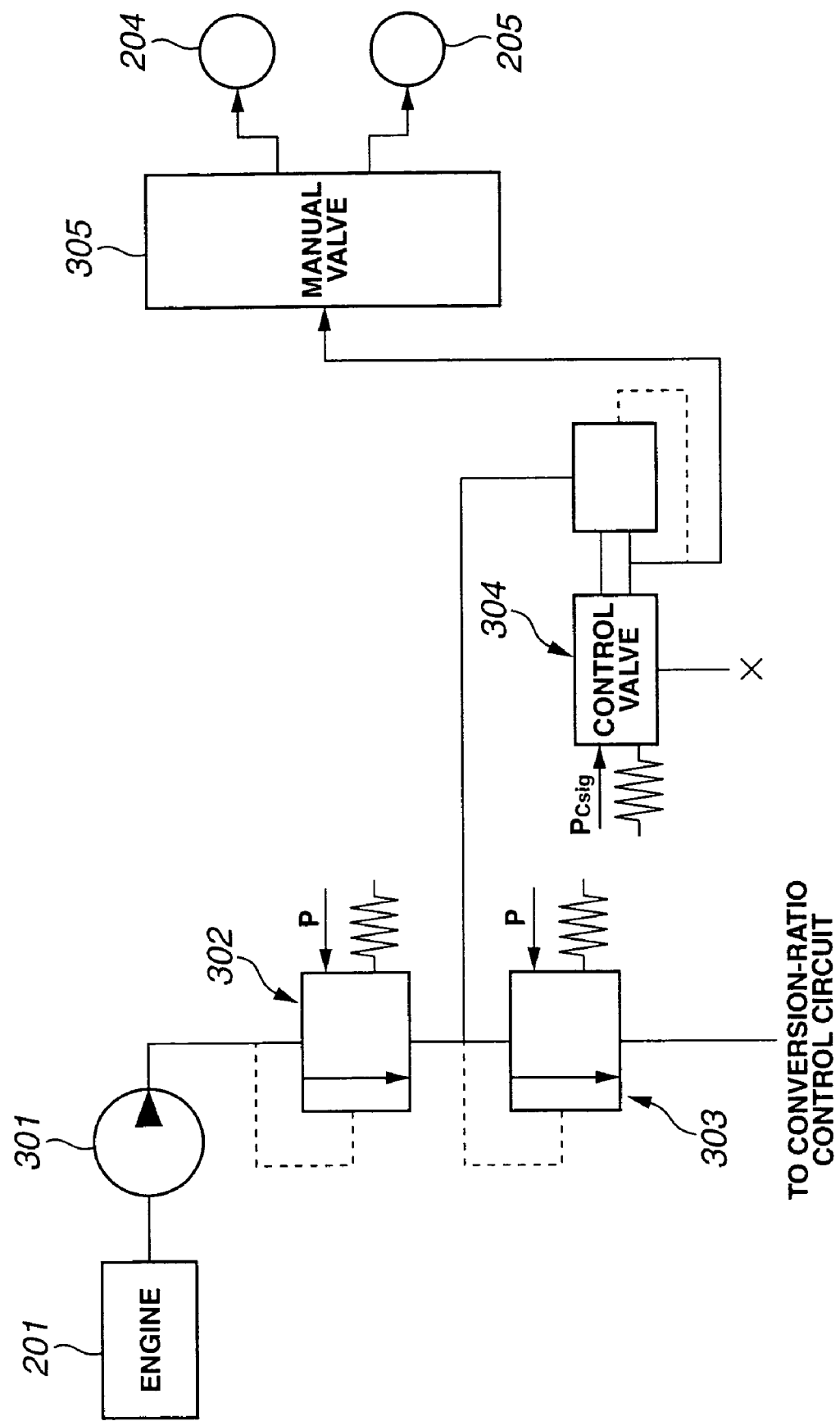

WHEN TVO = 0 (CREEP)

WHEN TVO ≠ 0 (START)

CREEP CONTROL SWITCHING

SYSTEM AND METHOD OF CONTROLLING AUTOMATIC TRANSMISSION

BACKGROUND OF THE INVENTION

The present invention relates to a system and method of controlling an automatic transmission which includes an electromagnetic clutch interposed between an engine and a transmission mechanism of the automatic transmission, for example, and serving as a start element for transferring engine torque to the transmission mechanism.

There are various automatic transmissions using an electromagnetic clutch, wherein the electromagnetic clutch includes an electromagnetic multiple disk clutch serving as a start element.

SUMMARY OF THE INVENTION

With such automatic transmissions, when creep control is carried out using the electromagnetic multiple disk clutch, it is necessary to control feeble clutch engaging force, which, however, is often affected by the oil viscosity due to oil temperature, individual variation in drag torque in the non-engaged state of the clutch, and the like, leading to a problem of poor controllability.

Moreover, at very low temperature, even if drag torque of the electromagnetic multiple disk clutch is smaller, drag torque occurring in a pilot clutch is amplified by a torque cam, which works to press a main clutch. Thus, when selecting the shift range from neutral (N) range to drive range (D) or from N range to reverse (R) range at a standstill of the vehicle, greater load is imposed on the engine, leading to possible occurrence of engine stop.

It is, therefore, an object of the present invention to provide a system and method of controlling an automatic transmission, which allow achievement of stable start control even if the controllability of the electromagnetic clutch cannot be secured at low oil temperature.

Generally, the present invention provides a system for controlling an automatic transmission, which comprises: a start clutch; an engagement element arranged in series to the start clutch, the engagement element being engaged during vehicle driving; and an electronic control unit (ECU) which controls the start clutch and the engagement element, the ECU being programmed to select, at vehicle start, one of the start clutch and the engagement element in accordance with one of an oil temperature within the transmission and a throttle-valve opening.

The main feature of the present invention lies in providing a method of controlling an automatic transmission with a start clutch and an engagement element arranged in series to the start clutch and engaged during vehicle driving, wherein the method comprises: selecting, at vehicle start, one of the start clutch and the engagement element in accordance with one of an oil temperature within the transmission and a throttle-valve opening.

BRIEF DESCRIPTION OF THE DRAWINGS

The other objects and features of the present invention will become apparent from the following description with reference to the accompanying drawings, wherein:

FIG. 4 is a hydraulic circuit diagram in an embodiment;

DETAILED DESCRIPTION OF THE INVENTION

Figure 1:
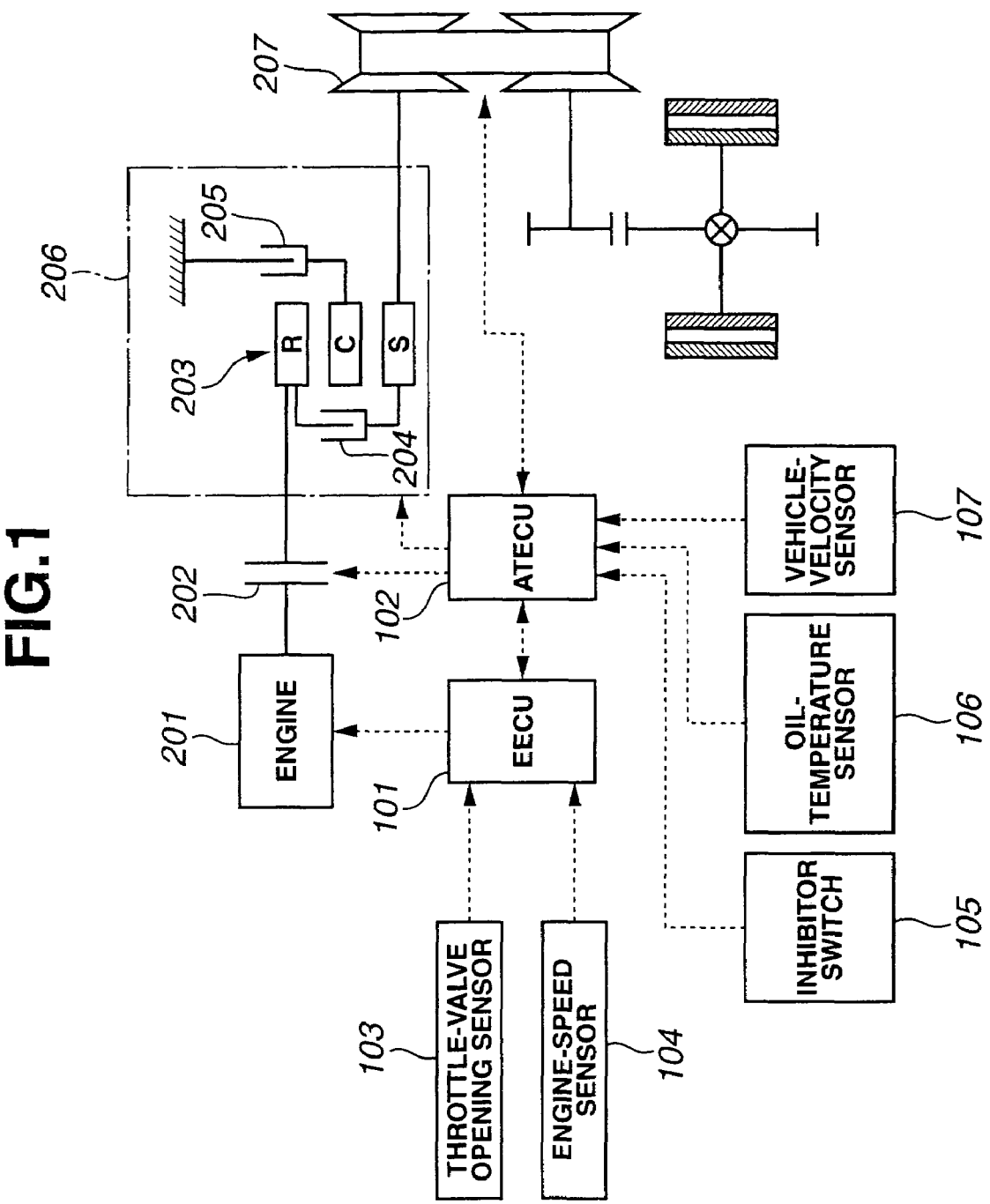
FIG. 1 is a block diagram showing a system for driving a motor vehicle including an automatic transmission, to which the present invention is applied.

Referring to the drawings, a description will be made about an embodiment of a system and method of controlling an automatic transmission according to the present invention.

Referring to FIG. 1, a vehicle driving system comprises an engine electronic control unit (EECU) 101, an automatic-transmission electronic control unit (ATECU) 102, a throttle-valve opening sensor 103, an engine-speed sensor 104, an inhibitor switch 105, an oil-temperature sensor 106, a vehicle-velocity sensors 107, an engine 201, an electromagnetic clutch or electromagnetic multiple disk clutch 202, a forward/reverse switching mechanism 206, and an automatic transmission 207.

Engine rotation outputted from the engine 201 is transmitted to the electromagnetic multiple disk clutch 202, which is then transmitted to the forward/reverse switching mechanism 206.

The forward/reverse switching mechanism 206 comprises a planetary-gear set 203, a forward clutch 204, and a reverse brake 205. The planetary-gear gear 203 comprises a sun gear S connected to a transmission input shaft, a carrier C connected to a reverse brake 205 which can engage with a transmission casing, and a ring gear R connected to an electromagnetic-multiple-disk-clutch output shaft.

During full engagement of the forward clutch 204, rotation of the ring gear R is united with that of the sun gear S to transmit to the transmission input shaft rotation of the electromagnetic-multiple-disk-clutch output shaft as it is. During engagement of the reverse brake 205, rotation of the electromagnetic-multiple-disk-clutch output shaft is reduced in the opposite direction to transmit it to the transmission input shaft. The details of forward/reverse control by engagement of the forward clutch 204 or the reverse brake 205 will be described later with reference to the collinear diagrams in FIGS. 3A-3C.

The engine speed sensed by the engine-speed sensor 104 and the throttle-valve opening (TVO) sensed by the throttle-valve opening sensor 103 are inputted to the EECU 101. The driver's selected shift range detected by the inhibitor switch 105, the oil temperature sensed by the oil-temperature sensor 106, and the vehicle velocity sensed by the vehicle-velocity sensor 107 are inputted to the ATECU 102.

The EECU 101 controls the engine 201 in accordance with detected sensor signals. The ATECU 102 controls the electromagnetic multiple disk clutch 202, forward/reverse switching mechanism 206, and automatic transmission 207 in accordance with detected sensor signals. The EECU 101 and the ATECU 102 transmit signals mutually to achieve optimal drive-system control.

Figure 2:
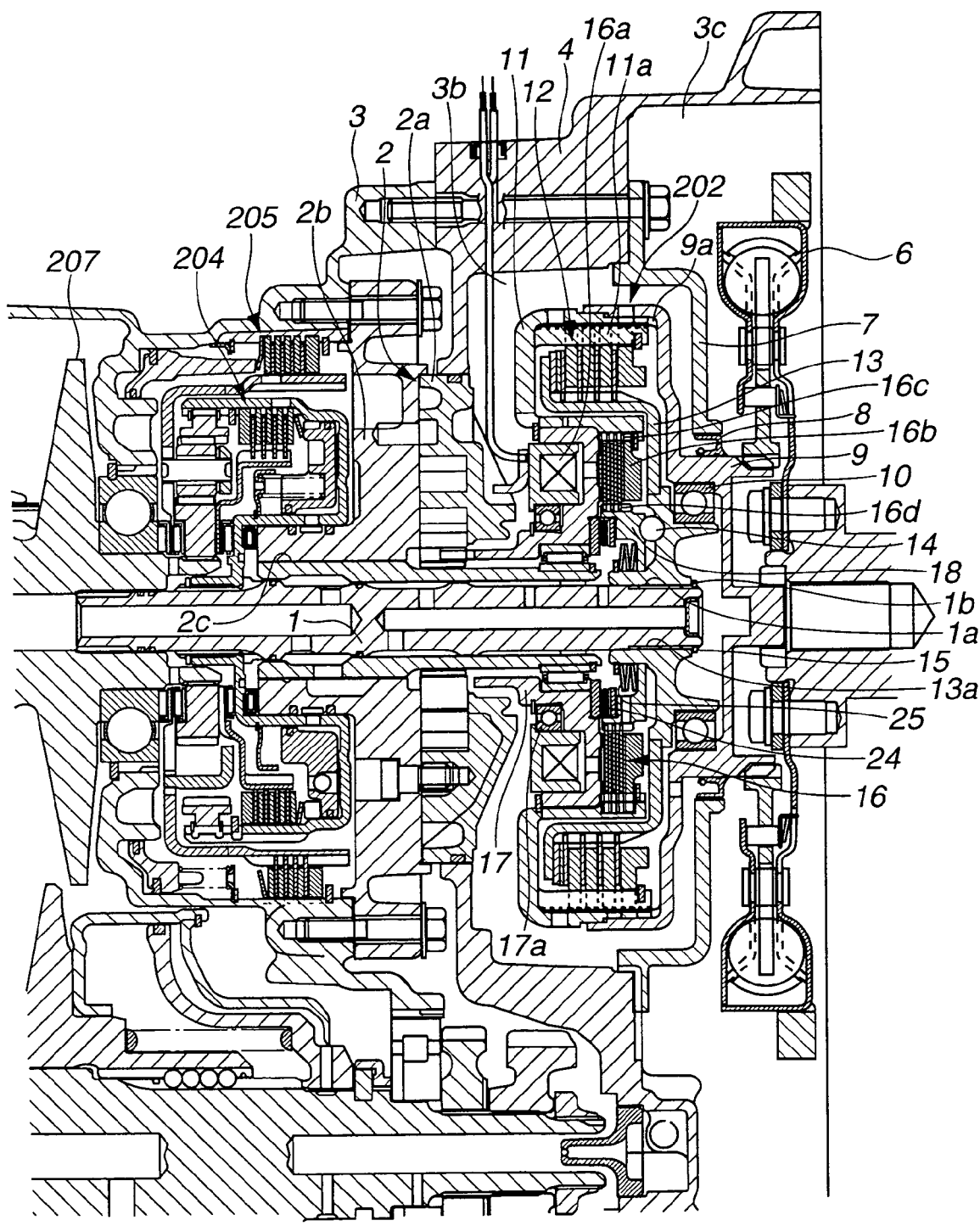
FIG. 2 is a sectional view showing the automatic transmission.

FIG. 2 shows electromagnetic multiple disk clutch 202 and its surroundings in the embodiment. A description is omitted about shift operation, etc. of the transmission mechanism of the automatic transmission 207 used in the embodiment.

Referring to FIG. 2, a converter housing 4 as a stationary-side housing is attached to a front-end opening of the transmission casing 3. A front cover 7 is attached to the converter housing 4. The transmission casing 3, part of the converter housing 4, and front cover 7 define a first compartment 3b to which lubrication is ensured. The front cover 7 defines a second compartment 3c which opens to the air and accommodates a torsional damper 6.

An oil pump 2 is interposed between the transmission casing 3 and the converter housing 4. The oil pump 2 is a typical gear pump constructed by accommodating an internal gear pump element in the space defined by a pump housing 2a and a pump cover 2b. A stationary hollow sleeve 2c is engaged on the inner periphery of the pump cover 2b to rotatably receive an input shaft 1 therein.

The electromagnetic multiple disk clutch 202 is arranged on a front end of the input shaft 1 which projects into the converter housing 4. The clutch 202 comprises an input clutch pack 12 formed by engagement between a spline 9a of a first input drum 9 and a spline 11a of a second input drum 11. A rotor 17 is unitarily rotatably engaged with the second input drum 11, and a drive-side clutch plate 16c including an armature 16b of an electromagnetic clutch 16 is also engaged therewith. An electromagnet 16a is relatively rotatably supported through a bearing 17a provided to the rotor 17.

A driven-side clutch plate 16d of the electromagnetic clutch 16 is engaged with a torque cam member 18. When the electromagnetic clutch 16 engages, rotation of the second input drum 11 is transmitted to the torque cam member 18. A loading cam 14 is arranged on the side face of the torque cam member 18 to produce axial thrust force between the torque cam member 18 and an input clutch hub 13.

Operation of the electromagnetic multiple disk clutch 202 will be described. Engine torque is transmitted to the torsional damper 6, first input drum 9, second input drum 11, and rotor 17 in this order. At this time, when current passes through the electromagnet 16a, the armature 16b is attracted by electromagnetic force, engaging the electromagnetic clutch 16. At this time, engine rotation is inputted to the loading cam 14 which makes the input clutch hub 13 produce thrust force for moving it rightward as viewed in FIG. 2 through cam action obtained by a ball rolling on the inclined surface. On the other hand, through a thrust bearing 24, thrust force as reaction force acts on the second input drum 11, rotor 17, and electromagnet 16a to move them leftward against a return disk spring 25.

The input clutch pack 12 is engaged by the above axial thrust force. With this engagement, torque transmitted to the first input drum 9 is transmitted to the input clutch hub 13, which is in turn transmitted to the input shaft 1. Specifically, after engagement of the input clutch pack 12, engine torque is transmitted to the input clutch hub 13 directly and not through the electromagnetic clutch 16, which is in turn transmitted to the input shaft 1.

Specifically, in the embodiment, the electromagnetic clutch 202 includes electromagnetic multiple disk clutch. Thus, transmitted engine torque is amplified by the loading cam 14 to engage the input clutch pack 12 serving as a main wet clutch, achieving direct transmission of engine torque from the input clutch hub 13 to the input shaft 1.

Figure 3A:
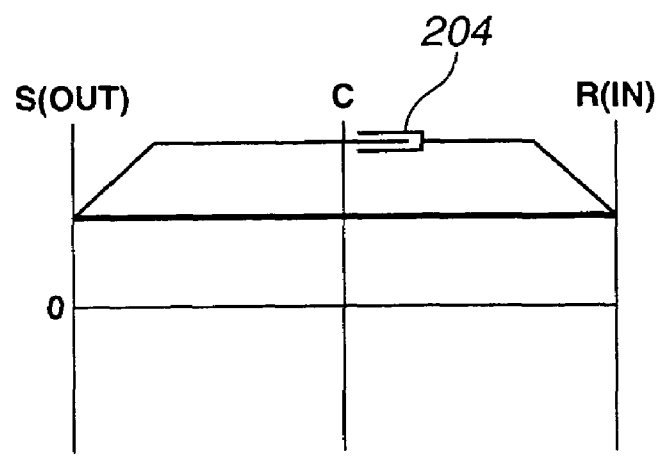
FIGS. 3A-3C are collinear diagrams showing change in engine speed due to engagement of a forward clutch or reverse brake of the automatic transmission.
Figure 3B:
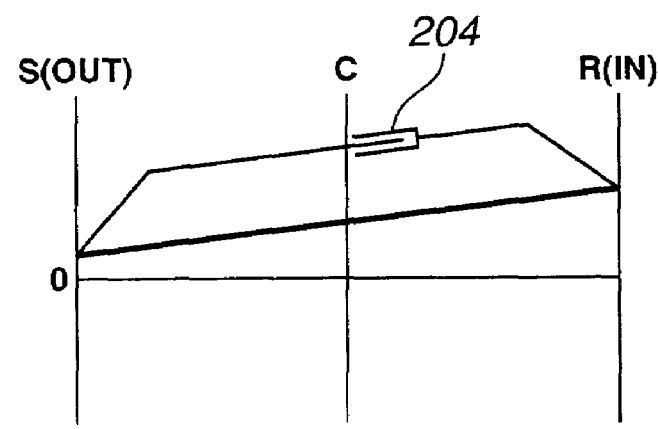
Figure 3C:
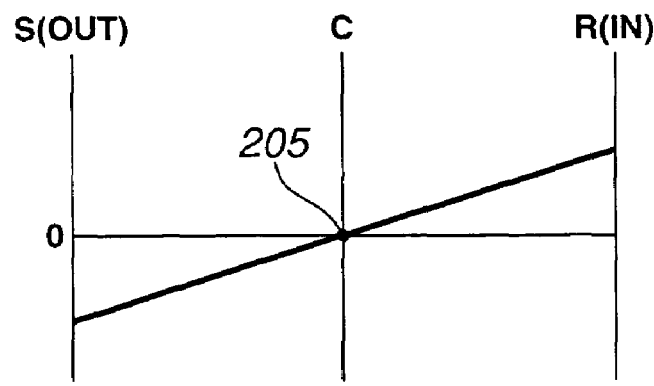

FIGS. 3A-3C are collinear diagrams show change in engine speed due to engagement of the forward clutch 204 or the reverse brake 205 in the embodiment. In any of the cases shown in FIGS. 3A-3C, engine rotation outputted from the electromagnetic multiple disk clutch 202 is inputted to the ring gear R of the forward/reverse switching mechanism 206.

FIG. 3A is a collinear diagram during full engagement of the forward clutch 204. Due to full engagement of the forward clutch 204, engine rotation inputted to the ring gear R is inputted to the sun gear S as it is, which is then inputted to the automatic transmission 207.

FIG. 3B is a collinear diagram during slip engagement of the forward clutch 204. Since the forward clutch 204 engages while slipping, engine rotation inputted to the ring gear R is reduced in rotational speed and outputted to the sun gear S, which is then outputted to the automatic transmission 207. Specifically, engine rotation outputted from the electromagnetic multiple disk clutch 202 is reduced in rotational speed and outputted to the automatic transmission 207.

FIG. 3C is a collinear diagram during engagement of the reverse brake 205. When the vehicle rolls backward, only the reverse brake 205 is engaged so that rotation inputted to the ring gear R is reduced and reversed to be outputted to the sun gear S, which is then inputted to the automatic transmission 207.

Referring to FIG. 4, the hydraulic circuit in the embodiment will be described. When a pump 301 is driven by the engine 201 to produce the hydraulic pressure, the pressure within the circuit is adjusted at a predetermined pressure by a first relief valve 302 and a second relief valve 303, which is supplied to a forward/reverse hydraulic-pressure control valve 304.

The forward/reverse hydraulic-pressure control valve 304 is a reducing valve, and serves to adjust the hydraulic pressure to be supplied to a manual valve 305 in accordance with the discharge of lubricating oil from a drain port. The control valve 304 is constructed such that when only a spring load is active therein, the rate of discharge of lubricating oil from the drain port is larger, and the rate of the hydraulic pressure to be supplied to the manual valve 305 is smaller. With this, when only a spring load is active in the control valve 304, small hydraulic pressure corresponding to creep can be supplied to the manual valve 305. When a command signal Pcsig is inputted to the control valve 304, a predetermined hydraulic pressure is produced accordingly. The hydraulic pressure produced in the control valve 304 is supplied to the forward clutch 204 and the reverse brake 205 through the manual valve 305.

Specifically, the forward/reverse hydraulic-pressure control valve 304 can secure the engagement capacity corresponding to creep by only the spring characteristic which is not affected by the oil temperature, resulting in accurate hydraulic control even at very low temperature. Moreover, since small engagement capacity corresponding to creep can be secured by a spring load only, the oil amount required for engagement can be reduced, resulting in improvement in fuel consumption.

Figure 5:
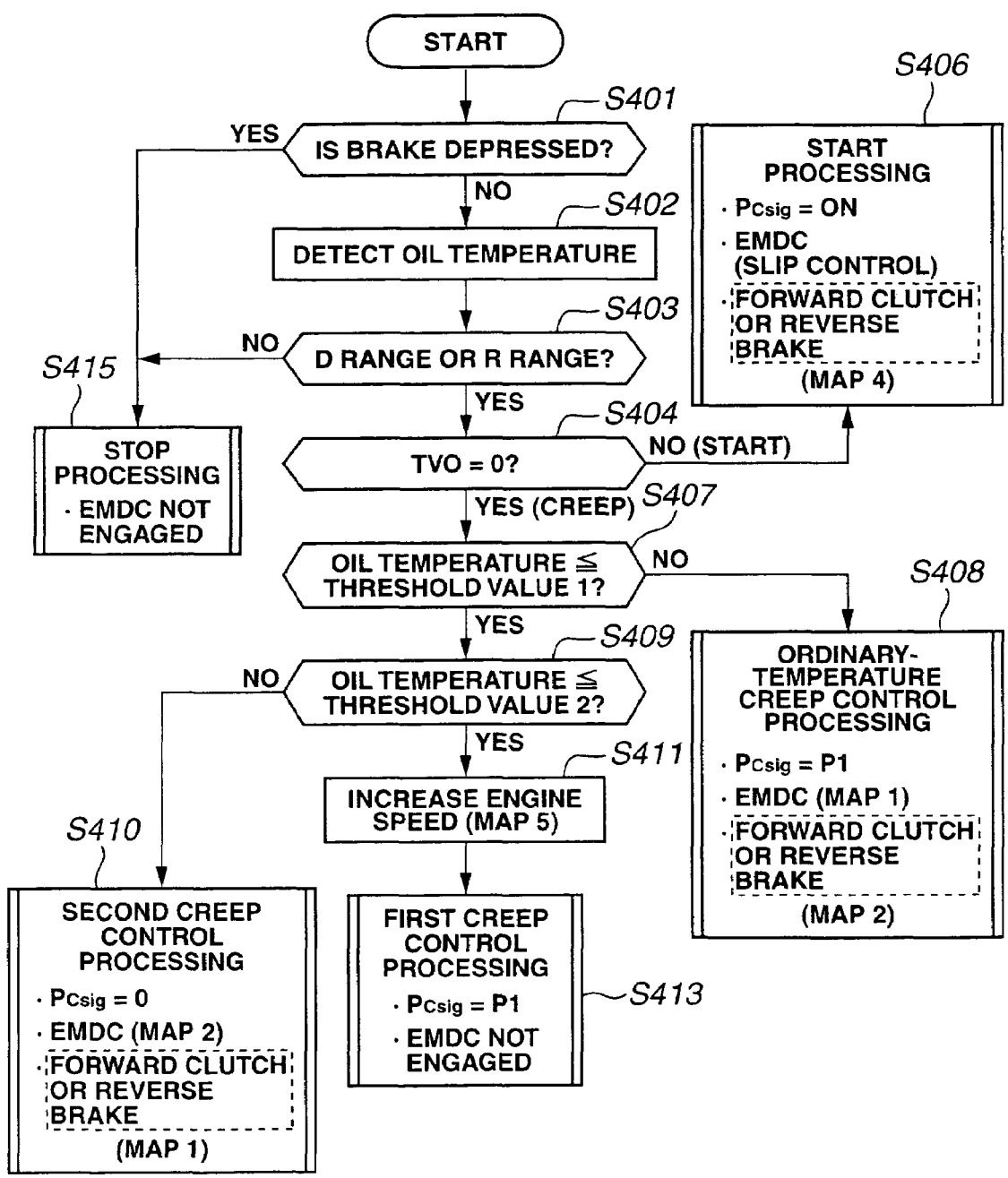
FIG. 5 is a flowchart showing operation of the embodiment.

Referring to FIG. 5, the contents of control of the embodiment in accordance with the oil temperature will be described.

At a step S401, it is determined whether or not the brake is depressed. If it is determined that the brake is depressed, control proceeds to a step S415, whereas if it is determined that the brake is not depressed, control proceeds to a step S402.

At the step S402, the oil temperature within the automatic transmission 207 is detected.

At a step S403, it is determined whether or not the driver's selected shift range is D or R range showing his/her driving intention. If it is determined that the shift range is D or R range, control proceeds to a step S404, whereas if it is determined that the shift range is not D or R range, control proceeds to the step S415.

At a step S404, it is determined whether or not the throttle-valve opening (TVO) is 0. If it is determined that the TVO=0, control proceeds to a step S407, whereas if it is determined that the TVO≠0, control proceeds to a step S406.

Figure 7:
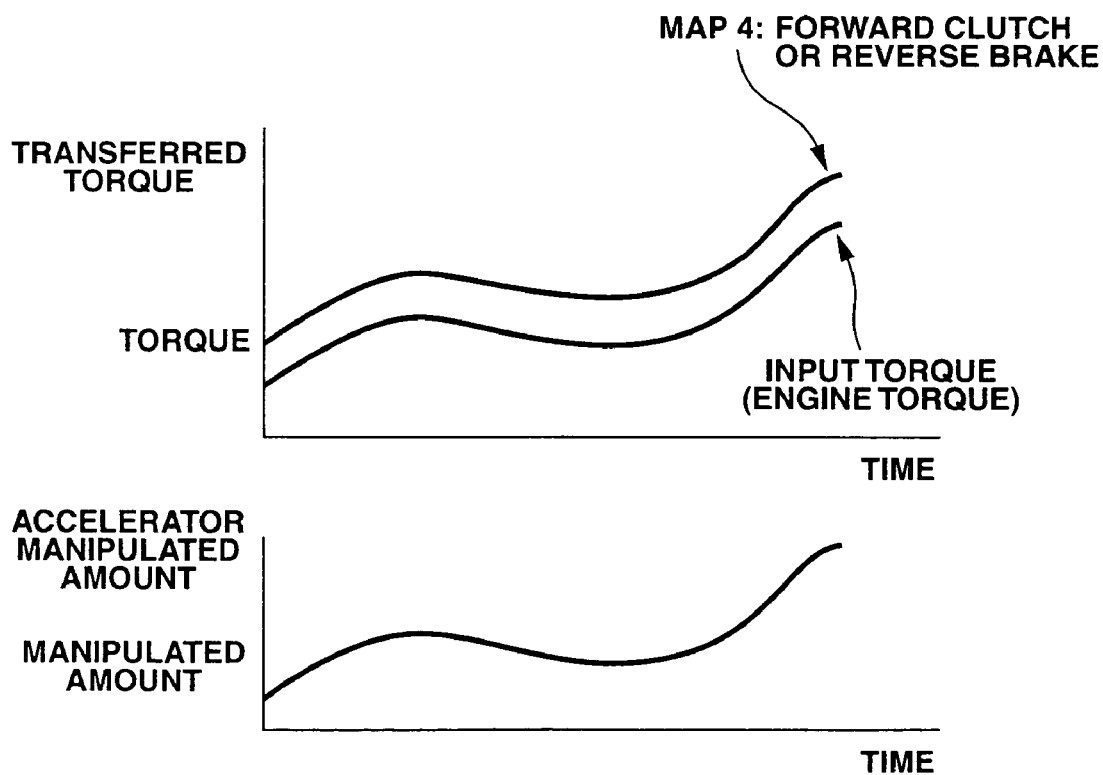
FIG. 7 is a map similar to FIG. 6, showing another transferred-torque characteristic in the embodiment.

At the step S406, start processing is carried out by turning on the command signal Pcsig to the forward/reverse hydraulic-pressure control valve 304, setting the engagement capacity of the forward clutch 204 or reverse brake 205 at engine torque or more as a map 4 shown in FIG. 7, and slip-controlling the electromagnetic multiple disk clutch 202.

At the step S407, it is determined whether or not the oil temperature is equal to or smaller than a threshold value 1. If it is determined that the oil temperature≦threshold value 1, control proceeds to a step S409, whereas if it is determined that the oil temperature>threshold value 1, control proceeds to a step S408.

At the step S408, ordinary-temperature creep control processing is carried out by setting at a predetermined value P1 the command signal Pcsig to the forward/reverse hydraulic-pressure control valve 304, setting the engagement capacity of the forward clutch 204 or reverse brake 205 as a map 2 shown in FIG. 7, and controlling the electromagnetic multiple disk clutch 202 in accordance with a map 1 shown in FIG. 7.

At the step S409, it is determined whether the oil temperature is equal to or smaller than a threshold value 2. If it is determined that the oil temperature≦threshold value 2, control proceeds to a step S411, whereas if it is determined that the oil temperature>threshold value 2, control proceeds to a step S410.

At the step S410, second creep control processing is carried out by setting at 0 the command signal Pcsig to the forward/reverse hydraulic-pressure control valve 304, setting the engagement capacity of the forward clutch 204 or reverse brake 205 as shown in the map 1, and controlling the electromagnetic multiple disk clutch 202 in accordance with the map 2.

Figure 8:
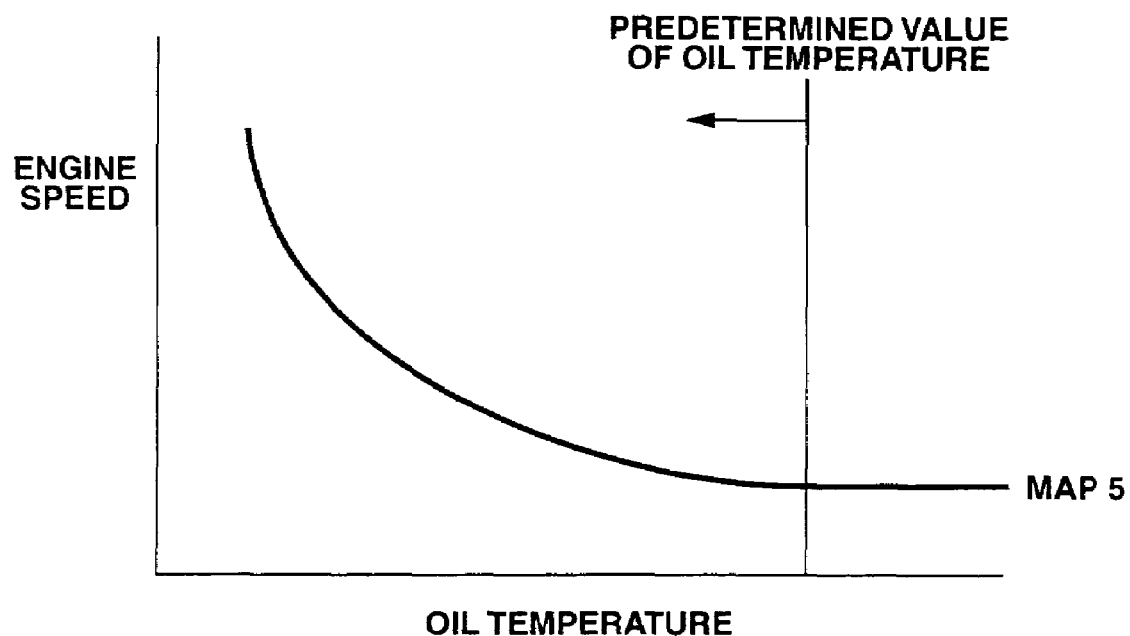
FIG. 8 is a graph showing the relationship between the oil temperature and the engine speed in the embodiment.

At the step S411, the engine speed is increased in accordance with a map 5 shown in FIG. 8.

As a step S413, first creep control processing is carried out by setting at predetermined value P1 the command signal Pcsig to the forward/reverse hydraulic-pressure control valve 304, setting the engagement capacity of the forward clutch 204 or reverse brake 205 as shown in the map 2, and outputting a non-engagement command to the electromagnetic multiple disk clutch 202.

At the step S415, stop processing is carried out by outputting a non-engagement command to the electromagnetic multiple disk clutch 202.

Figure 6:
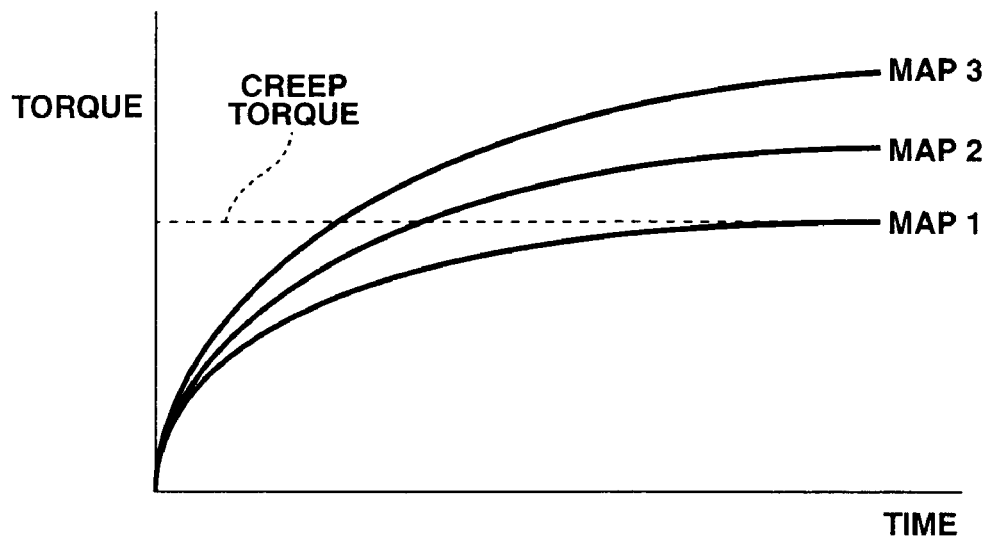
FIG. 6 is a map showing a transferred-torque characteristic in the embodiment.

FIG. 6 shows transferred-torque characteristics when TVO=0 in the embodiment. During creep (TVO=0), feeble engagement force should be controlled. When the detected oil temperature is higher than the threshold value 1 showing ordinary temperature, the electromagnetic multiple disk clutch 202 has smaller drag torque, and thus higher controllability, so that the electromagnetic multiple disk clutch 202 serves as a start element to carry out creep control in accordance with the map 1.

On the other hand, when the oil temperature is equal to or smaller than the threshold value 1, there is an influence of drag torque. Thus, when the electromagnetic multiple disk clutch 202 serves as a start element, high controllability cannot be expected for an influence of the oil viscosity due to oil temperature, individual variation in drag torque of the electromagnetic multiple disk clutch 202. In the area that the oil temperature is greater than the threshold value 2, and equal to or smaller than the threshold value 1, the command signal Pcsig is set at 0 as described above to achieve the characteristics shown in the map 1 by a spring load of the forward/reverse hydraulic-pressure control valve 304 only. In this oil-temperature area, drag torque produced in the electromagnetic multiple disk clutch 202 is not always surely greater than that produced in the forward clutch 204 (or reverse brake 20), so that an engagement command for providing torque greater than creep torque is outputted to the electromagnetic multiple disk clutch 202 (refer to the map 2).

In the area that the oil temperature is equal to or smaller than the threshold value 2, the oil viscosity is higher, and thus sufficient oil amount may not be secured in the hydraulic circuit as well. Thus, the command signal Pcsig is set at predetermined value P1 to supply higher hydraulic pressure to the forward clutch 204 or reverse brake 205, achieving the characteristics shown in the map 2. At this time, since it is estimated that drag torque produced in the electromagnetic multiple disk clutch 202 is surely higher than that produced in the forward clutch 204 or reverse brake 205, a non-engagement command is outputted to the electromagnetic multiple disk clutch 202, accelerating heat generation by active slip.

FIG. 7 shows transferred torque when TVO≠0 in the embodiment. When TVO≠0, i.e. the accelerator is depressed, the torque capacity of the forward clutch 204 (or reverse brake 205) is set to be higher than input torque (engine torque) in accordance with the map 4, which is the capacity allowing full engagement. And the electromagnetic multiple disk clutch 202 serves as a start element. Under the situation that start takes place, no control of feeble engagement force is needed contrary to during creep, so that the electromagnetic multiple disk clutch 202 serves as a start element.

FIG. 8 shows map 5 illustrating the relationship between the oil temperature and the engine speed in the embodiment. When the oil temperature is equal to or smaller than less than the threshold value 2, the engine speed is increased with the oil temperature. Output produced by the engine 201 is given by the equation: Output=(transferred torque)×(engine speed). At given output of the engine 201, when the oil temperature is lower, and thus the oil viscosity is higher, transferred torque becomes greater so that the engine speed becomes smaller than required engine speed (minimum engine speed), leading to possible occurrence of engine stop. Then, when the oil temperature is lower than ordinary temperature, the engine speed is increased in proportion as the oil temperature lowers. Since the engine speed is increased in proportion as the oil temperature lowers, engine stop can be prevented from occurring at N-D select or N-R select. Moreover, an increase in engine allows a rise in oil temperature due to agitation of oil.

The heat generation amount per unit time of the clutch is given by the equation: Heat generation amount=(transferred torque)×(relative rotational speed). This means that heat generation per unit time of the clutch is increased by increasing transferred torque and relative rotational speed. Thus, relative rotational speed is increased by increasing the engine speed on the input side, and the engagement torque capacity of the forward clutch 204 (or reverse brake 205) is set to be higher than a torque value required for creep. This allows not only compensation of the shortage of the oil amount, but increase in amount of self heat generation of the forward clutch 204 (or reverse clutch 20) by slippage, raising the oil temperature quickly, resulting in possible shift to current control for the electromagnetic multiple disk clutch 202.

Figure 9:
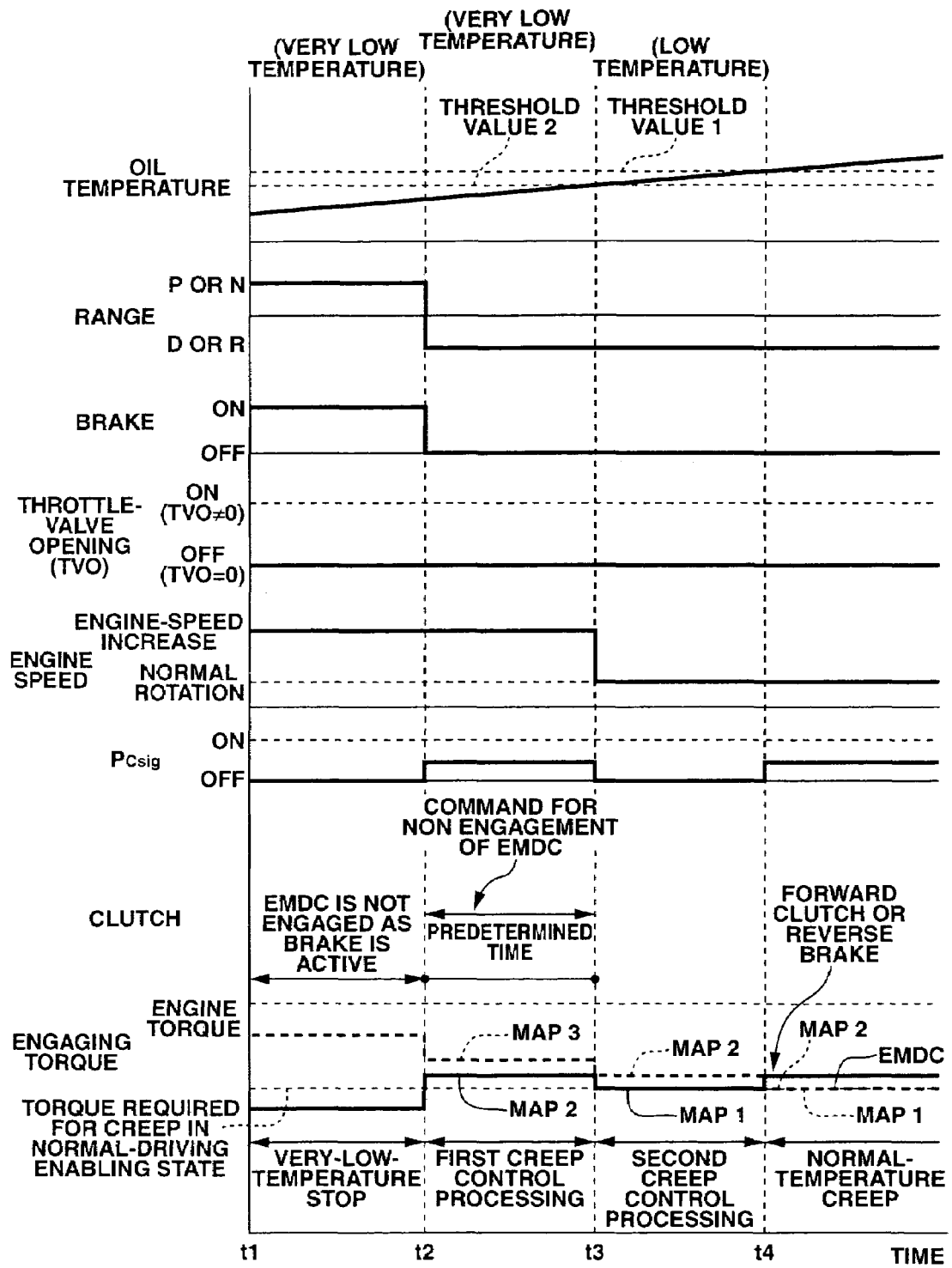
FIG. 9 is a time chart showing switching of creep control in the embodiment.

Referring to FIG. 9, the contents of creep control switching in the embodiment will be described.

At time t1, since the oil temperature sensed by the oil-temperature sensor 106 is very low, the engine speed is increased in accordance with the map 5 shown in FIG. 8. Since the driver's selected shift range detected by the inhibitor switch 105 is P or N range, and the brake is depressed, the electromagnetic multiple disk clutch 202 and the forward clutch 204 or reverse brake 205 are put in non-engagement.

In this state, when increasing the engine speed based on the oil temperature in accordance with the map 5 shown in FIG. 8, the electromagnetic multiple disk clutch 202 is in non-engagement, whereas since the electromagnetic multiple disk clutch 202 is greater in drag torque than the electromagnetic multiple disk clutch 202 and the forward clutch 204 (or reverse brake 205), the forward clutch 204 (or reverse brake 205) produces slip actively. Since the oil viscosity is higher due to low oil temperature to provide less lubrication amount to the electromagnetic multiple disk clutch 202, frictional heat is produced between the clutch plates, thus allowing increasing of the oil temperature.

As for creep at low temperature, at time t2, the driver releases the brake to achieve TVO=0, so that it is determined that the vehicle is creeping. Since the oil temperature is at a very low value (smaller than the threshold value 2), the electromagnetic multiple disk clutch 202 may suffer variation in clutch operation due to drag torque. Here, the clutch 202 produces greater drag torque than creep torque.

Then, first creep control processing is carried out by outputting a non-engagement command to the electromagnetic multiple disk clutch 202 and setting the command signal Pcsig for the engagement torque capacity of the forward clutch 204 (or reverse brake 205) at predetermined value P1 which is higher than the value for producing actual creep torque, ensuring creep control with the forward clutch 204 (or reverse brake 205). Moreover, the engine speed is increased in proportion as the oil temperature lowers in accordance with the map 5. The reason that the command signal Pcsig is set at higher value P1 is to increase the heat generation amount while coping with possible non-supply of required amount of oil caused by the high oil viscosity due to low oil temperature. Moreover, the engine speed is increased to thereby prevent engine stop and increase the slip amount actively, achieving a rise in oil temperature by oil agitation and self heat generation.

At time t3, when the oil temperature exceeds the threshold value 2, a command for increasing the engine speed is released to achieve ordinary rotation. Then, second creep control is carried out by setting at 0 the command signal Pcsig for engagement torque capacity of the forward clutch 204 (or reverse brake 205), ensuring creep control by a spring set load only. Moreover, since drag torque produced in the electromagnetic multiple disk clutch 202 is not always surely greater than creep torque, an engagement command for providing torque slightly greater than creep torque is outputted (refer to the map 2).

At time t4, when the oil temperature exceeds the threshold value 1, it is determined that the oil temperature is at an ordinary value, at which the controllability of the electromagnetic multiple disk clutch 202 is secured. Thus, the start element for carrying out creep control is switched from the forward clutch 204 (or the reverse brake 205) to the electromagnetic multiple disk clutch 20, carrying out ordinary-temperature creep control processing.

Figure 10:
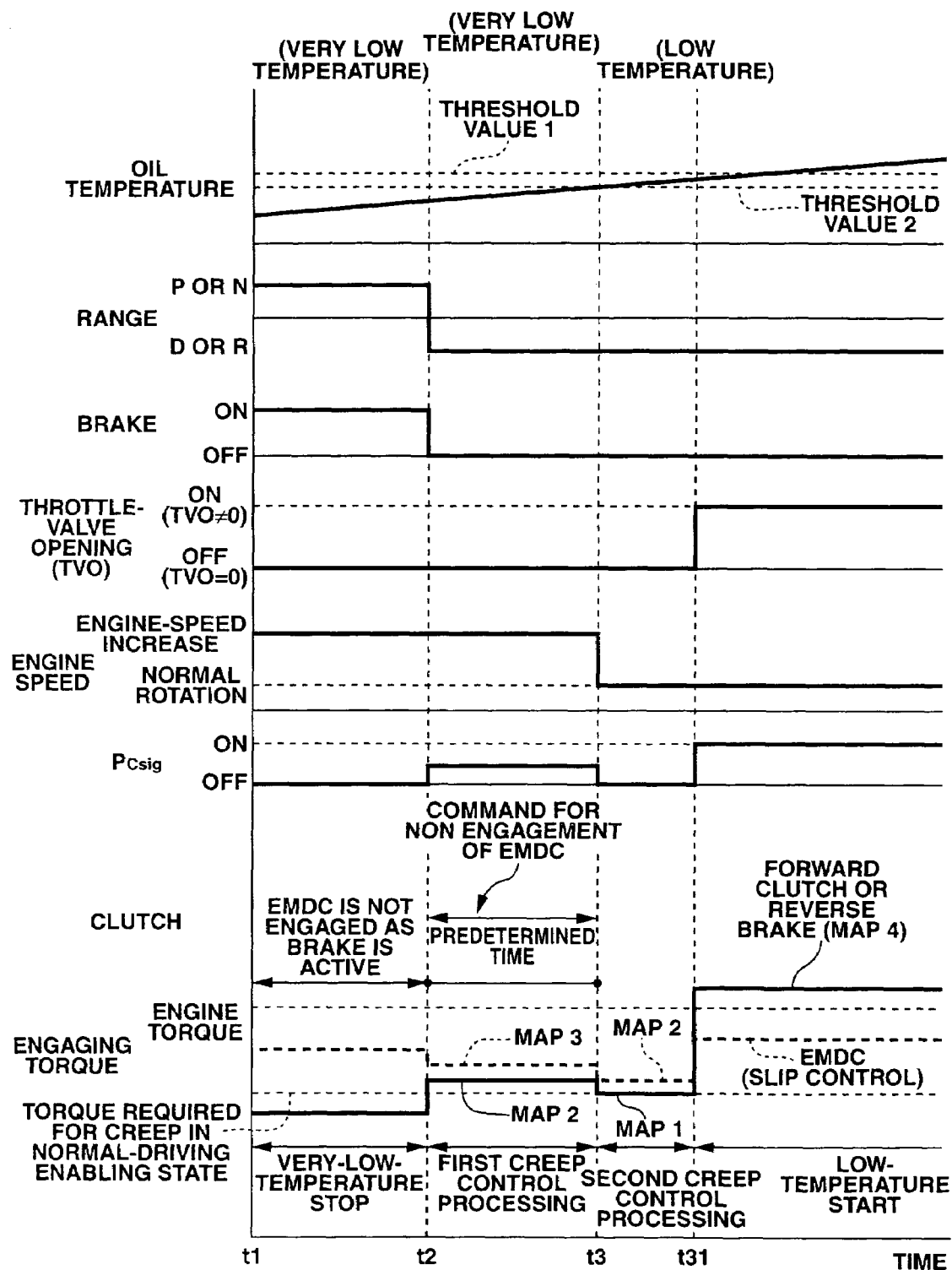
FIG. 10 is a chart similar to FIG. 9, showing switching from creep control to start control in the embodiment.

FIG. 10 is a time chart when the vehicle starts during low-temperature creep control (during execution of first or creep control processing). Note that since operation from time t1 to time t3 is the same as that shown in FIG. 9, only different points will be described.

At time t31, when the driver depresses the accelerator during execution of second creep control to achieve TVO≠0, the command signal Pcsig as engagement torque capacity command of the forward clutch 204 (or reverse brake 205) is turned on to put the forward clutch 204 in full engagement so as to achieve higher transferred torque than engine input torque, switching to start control with the electromagnetic multiple disk clutch 202.

Specifically, even if creep control is carried out with the forward clutch 204 (or reverse brake 205) at the time of start, start control is carried out with the electromagnetic multiple disk clutch 202, allowing start of higher controllability.

Figure 11:
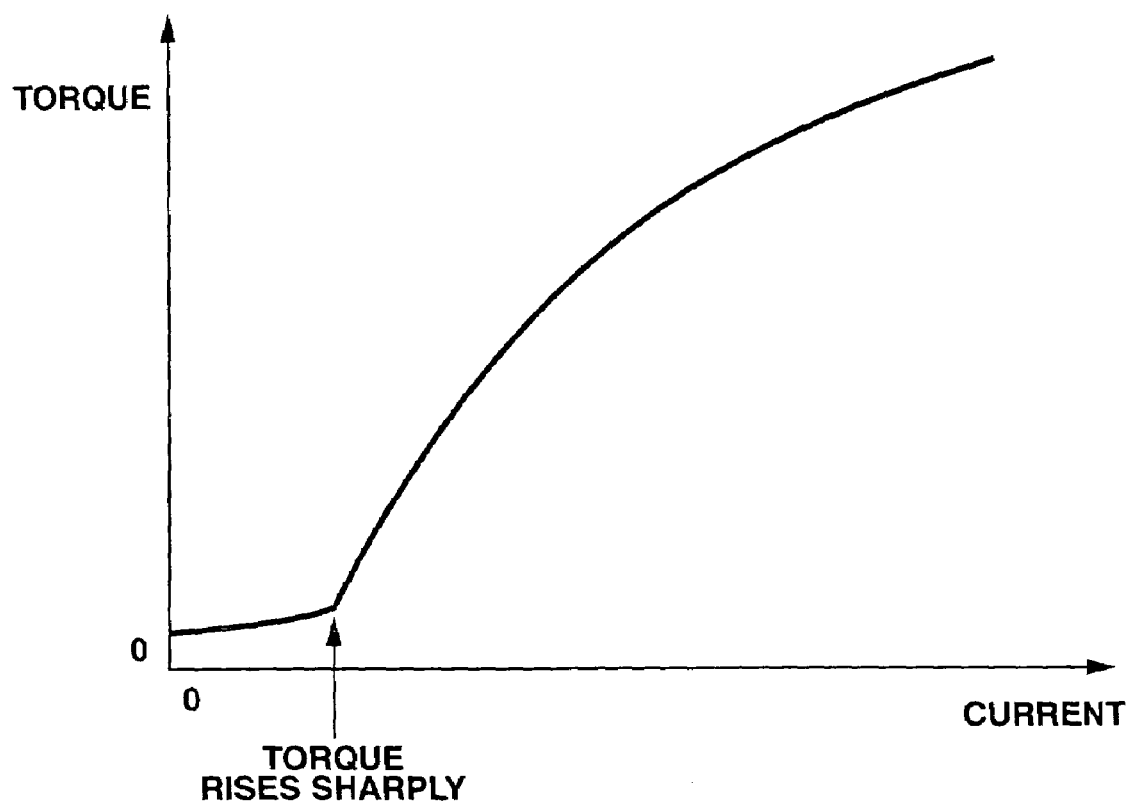
FIG. 11 is a graph similar to FIG. 8, showing a current-torque characteristic of an electromagnetic multiple disk clutch in the embodiment.

Referring to FIG. 11, the current-torque characteristic of the electromagnetic multiple disk clutch 202 in the embodiment will be described. As shown in FIG. 11, in the low-torque area, the current-torque characteristic of the electromagnetic multiple disk clutch 202 has a point where torque rises sharply. The electromagnetic multiple disk clutch 202 is under current control, and thus has a point where torque rises sharply in the low-torque area. The use of a value near the point where torque rises sharply may result in occurrence of judder. Then, in the low-torque area, creep control is carried out using the forward clutch 204 (or reverse brake 205) as a start element to restrain occurrence of judder. And in other areas (at the time of start), start of higher controllability is achieved with the electromagnetic multiple disk clutch 202.

The embodiment produces the following effects:

1) The start element is switched between the electromagnetic multiple disk clutch 202 and the forward clutch 204 (or reverse brake 205) in accordance with the oil temperature and the throttle-valve opening. This allows achievement of stable creep control at very low temperature.

2) At the time of start, even if creep control is carried out with the forward clutch 204 (or reverse brake 205), it is switched to start control with the electromagnetic multiple disk clutch 202. This allows achievement of stable start control.

3) The electromagnetic clutch includes electromagnetic multiple disk clutch 202 with loading cam 14. The electromagnetic multiple disk clutch 202 provides high controllability by small electromagnetic force, but it is often affected by drag torque at low oil temperature, etc. In the embodiment, since the start element is switched to the forward clutch 204 (or reverse brake 205) as described above, stable creep control can be achieved at all times.

4) During creep control at very low temperature (smaller than the threshold value 2), the torque capacity of the forward clutch 204 (or reverse brake 205) is set to correspond to creep torque, and a non-engagement command is provided to the electromagnetic multiple disk clutch 202. Torque of the electromagnetic multiple disk clutch 202 becomes higher by drag torque due to low oil temperature. However, since the forward clutch 204 (or reverse brake 205) is creep-controlled to produce stable creep torque, and a non-engagement command is provided to the electromagnetic multiple disk clutch 202, active slippage can be obtained to increase the oil temperature by oil agitation and heat generation.

5) In the hydraulic circuit, supply of the hydraulic pressure to the forward clutch 204 (or reverse brake 205) is carried out by the forward/reverse hydraulic-pressure control valve 304 which secures the engagement capacity corresponding to creep by a spring load. The spring load is less affected by the oil temperature and oil viscosity, allowing accurate hydraulic control at very low temperature as well. Moreover, there is no need of the signal pressure, etc., allowing a reduction in lubrication amount required for engagement, resulting in improvement in fuel consumption.

6) During creep control at very low temperature (smaller than he threshold value 2), the engagement command P1 for providing torque greater than torque required for creep is provided to the forward/reverse hydraulic-pressure control valve 304. With this, even if sufficient oil amount cannot be secured due to oil viscosity, creep torque can surely be secured to achieve further increase in heat generation amount. Moreover, the engine speed is increased to thereby prevent engine stop and increase actively the slip amount of the electromagnetic multiple disk clutch 202 and the forward clutch 204 (or reverse brake 205), resulting in a rise in oil temperature by oil agitation and self heat generation.

Having described the present invention in connection with the illustrative embodiment, it is noted that the present invention is not limited thereto, and various changes and modifications can be made without departing from the scope of the present invention.

The entire teachings of Japanese Patent Application 2004-237582 filed Aug. 17, 2004 are hereby incorporated by reference.

What is claimed is:

1. A system for controlling an automatic transmission, comprising:
    a start clutch;
    an engagement element arranged in series to the start clutch, the engagement element being engaged during vehicle driving; and
    an electronic control unit (ECU) which controls the start clutch and the engagement element, the ECU being programmed to select, at vehicle start, one of the start clutch and the engagement element in accordance with one of an oil temperature within the transmission and a throttle-valve opening,
    wherein the ECU is further programmed to:
    determine whether or not the oil temperature is smaller than a predetermined value;
    set, when it is determined that the oil temperature is smaller than the predetermined value, a driver's selected shift range is a drive range, and an accelerator fails to be depressed, an engagement torque capacity of the engagement element at a first value required for creep; and
    set, when it is determined that the oil temperature is smaller than the predetermined value, the driver's selected shift range is the drive range, and the accelerator is depressed, at least the engagement torque capacity of the engagement element at a second value greater than an input torque.

2. The system as claimed in claim 1, wherein the ECU selects the engagement element when the oil temperature is very low, and the throttle-valve opening is substantially zero.

3. The system as claimed in claim 1, wherein the ECU selects the start clutch when the oil temperature is low, and the throttle-valve opening fails to be zero, wherein the start clutch is slip-controlled.

4. The system as claimed in claim 1, wherein the start clutch comprises an electromagnetic clutch, the electromagnetic clutch comprising an electromagnetic multiple disk clutch including a pilot clutch engaged by an electromagnetic force and a main clutch engaged by an engaging force of the pilot clutch amplified by a cam.

5. The system as claimed in claim 4, wherein the ECU is further programmed to:

provide, when it is determined that the oil temperature is smaller than the predetermined value, a non-engagement command to the electromagnetic clutch; and
set the engagement torque capacity at the first value.

6. The system as claimed in claim 1, wherein the engagement element is engaged by an engagement pressure supplied to a piston chamber.

7. The system as claimed in claim 6, further comprising a reducing valve which adjusts the engagement pressure, the reducing valve supplying the engagement pressure in accordance with a set load of a resilient member and a signal pressure, wherein the set load is set at a value for securing the engagement torque capacity corresponding to creep.

8. The system as claimed in claim 1, wherein the ECU is further programmed to:
    increase, when it is determined that the oil temperature is smaller than the predetermined value, an engine speed in proportion as the oil temperature lowers; and
    set the engagement torque capacity at a third value greater than the first value.

9. A system for controlling an automatic transmission for a vehicle, the system comprising:
    a start clutch having an engaged state allowing the vehicle to start;
    an engagement element arranged in series to the start clutch, the engagement element being engaged during vehicle driving;
    means for controlling the start clutch and the engagement element, the controlling means controlling selectively one of the start clutch and the engagement element for allowing the vehicle to start in accordance with one of an oil temperature within the transmission and a throttle-valve opening;
    means for determining whether or not the oil temperature is smaller than a predetermined value;
    means for setting, when it is determined that the oil temperature is smaller than the predetermined value, a driver's selected shift range is a drive range, and an accelerator fails to be depressed, an engagement torque capacity of the engagement element at a first value required for creep; and
    means for setting, when it is determined that the oil temperature is smaller than the predetermined value, the driver's selected shift range is the drive range, and the accelerator is depressed, at least the engagement torque capacity of the engagement element at a second value greater than an input torque.

10. A method of controlling an automatic transmission with a start clutch and an engagement element arranged in series to the start clutch and engaged during vehicle driving, the method comprising:
    selecting, at vehicle start, one of the start clutch and the engagement element in accordance with one of an oil temperature within the transmission and a throttle-valve opening;
    determining whether or not the oil temperature is smaller than a predetermined value;
    setting, when it is determined that the oil temperature is smaller than the predetermined value, a driver's selected shift range is a drive range, and an accelerator fails to be depressed, an engagement torque capacity of the engagement element at a first value required for creep; and
    setting, when it is determined that the oil temperature is smaller than the predetermined value, the driver's selected shift range is the drive range, and the accelerator is depressed, at least the engagement torque capacity of the engagement element at a second value greater than an input torque.

11. The method as claimed in claim 10, wherein the engagement element is selected when the oil temperature is very low, and the throttle-valve opening is substantially zero.

12. The method as claimed in claim 10, wherein the start clutch is selected when the oil temperature is low, and the throttle-valve opening fails to be zero, wherein the start clutch is slip-controlled.

13. The method as claimed in claim 10, wherein the start clutch comprises an electromagnetic clutch, the electromagnetic clutch comprising an electromagnetic multiple disk clutch including a pilot clutch engaged by an electromagnetic force and a main clutch engaged by an engaging force of the pilot clutch amplified by a cam, the method further comprising:

providing, when it is determined that the oil temperature is smaller than the predetermined value, a non-engagement command to the electromagnetic clutch; and setting the engagement torque capacity at the first value.

14. The method as claimed in claim 10, further comprising:

increasing, when it is determined that the oil temperature is smaller than the predetermined value, an engine speed in proportion as the oil temperature lowers; and setting the engagement torque capacity at a third value greater than the first value.

* * * * *